United States Patent [19]
Krishna et al.

[11] Patent Number: 5,267,230
[45] Date of Patent: Nov. 30, 1993

[54] METHOD AND APPARATUS FOR COMMUNICATION MAINTENANCE AND TERMINATION

[75] Inventors: Prathivadhi B. Krishna, Boynton Beach; Raul Pombo, Boca Raton, both of Fla.

[73] Assignee: Motorola, Inc., Schaumburg, Ill.

[21] Appl. No.: 673,427

[22] Filed: Mar. 22, 1991

[51] Int. Cl.$^5$ ............................................. H04J 3/14
[52] U.S. Cl. ..................... 370/13; 371/57.1; 375/104; 379/58; 455/63; 455/296
[58] Field of Search ............ 370/13, 14, 95.1, 95.3; 375/104; 379/58-61, 1; 455/63, 200.1, 212, 223, 296, 194.1, 33.1, 218-219; 371/57.1, 64, 65

[56] References Cited

U.S. PATENT DOCUMENTS

| | | | |
|---|---|---|---|
| 3,962,464 | 6/1976 | Templea | 370/13 |
| 4,025,853 | 5/1977 | Addeo | 455/37.1 |
| 4,480,335 | 10/1984 | Kishi | 455/212 |
| 4,688,207 | 8/1987 | Yoshimoto | 370/13 |
| 4,856,084 | 8/1989 | Richards, Jr. | 455/223 |
| 4,972,510 | 11/1990 | Guizerix et al. | 375/104 |
| 5,003,556 | 3/1991 | Curtis et al. | 455/218 |

OTHER PUBLICATIONS

MPT 1375, Common Air Interface Specification To Be Used For The Interworking Between Cordless Telephone Apparatus, May, 1989, pp. i through 4-26.
Motorola's brochure "The Personal Communications Gateway", 1990, eight pages.
Motorola's brochure "Silverlink 2000 Personal Telephone CT2/CAI Compatible", 1990, six pages.
Motorola's brochure "Silverlink Telepoint Base Station CT2/CAI Compatible", 1990, four pages.
Motorola's brochure "Silverlink 2010 and 2020 Personal Base Stations CT2/CAI Compatible", 1990, four pages.
Motorola's brochure "Silverlink MNCC and BMBS", 1990, four pages.

*Primary Examiner*—Douglas W. Olms
*Assistant Examiner*—Hassan Kizou
*Attorney, Agent, or Firm*—Thomas G. Berry; Daniel R. Collopy

[57] ABSTRACT

A communication system base site (300) receives a signal (400) representing voice information (402) and data information (404 or 404') from a communication channel. At least the data information is processed to verify the integrity of the communication channel, and the voice information (402) is transmitted when the integrity of the communication channel is verified.

16 Claims, 5 Drawing Sheets

METHOD AND APPARATUS FOR COMMUNICATION MAINTENANCE AND TERMINATION

FIELD OF THE INVENTION

This invention relates in general to communication systems, and more specifically to those communication systems having at least one party to a communication via communicate via wireless communication channel, and is particularly directed toward a method and apparatus of maintaining and terminating a communication depending upon the status of the wireless communication channel.

BACKGROUND OF THE INVENTION

Several contemporary communication systems allow a party to a communication communicate via a wireless channel (or link). For example, cordless telephones allow a wireless handset to communicate with a telephone network via a base unit or station. The handset, however, typically has a limited transmission range that limits the area in which a user may roam while communicating. Users that roam near the limit of the the handset transmission range typically notice a sharp increase in noise (or "static") on the channel. Unfortunately, due to the duplex nature of telephone type communication, the other party to the conversation will also hear the noise, even if that party employs a conventional wired telephone handset. Ultimately, if the wireless handset roams to a position where communication with the base unit is no longer possible, the other party will receive only noise, which continues to be sent by the base unit until the failure of the communication channel can be detected by the base unit. Accordingly, a need exists for a technique to rapidly determine the integrity of the wireless communication channel.

SUMMARY OF THE INVENTION

Briefly, according to the invention, a communication system base site receives a signal representing voice information and data information from a communication channel. At least the data information is processed to verify the integrity of the communication channel, and the voice information is transmitted when the integrity of the communication channel is verified.

DESCRIPTION OF A PREFERRED EMBODIMENT

Figure 1:
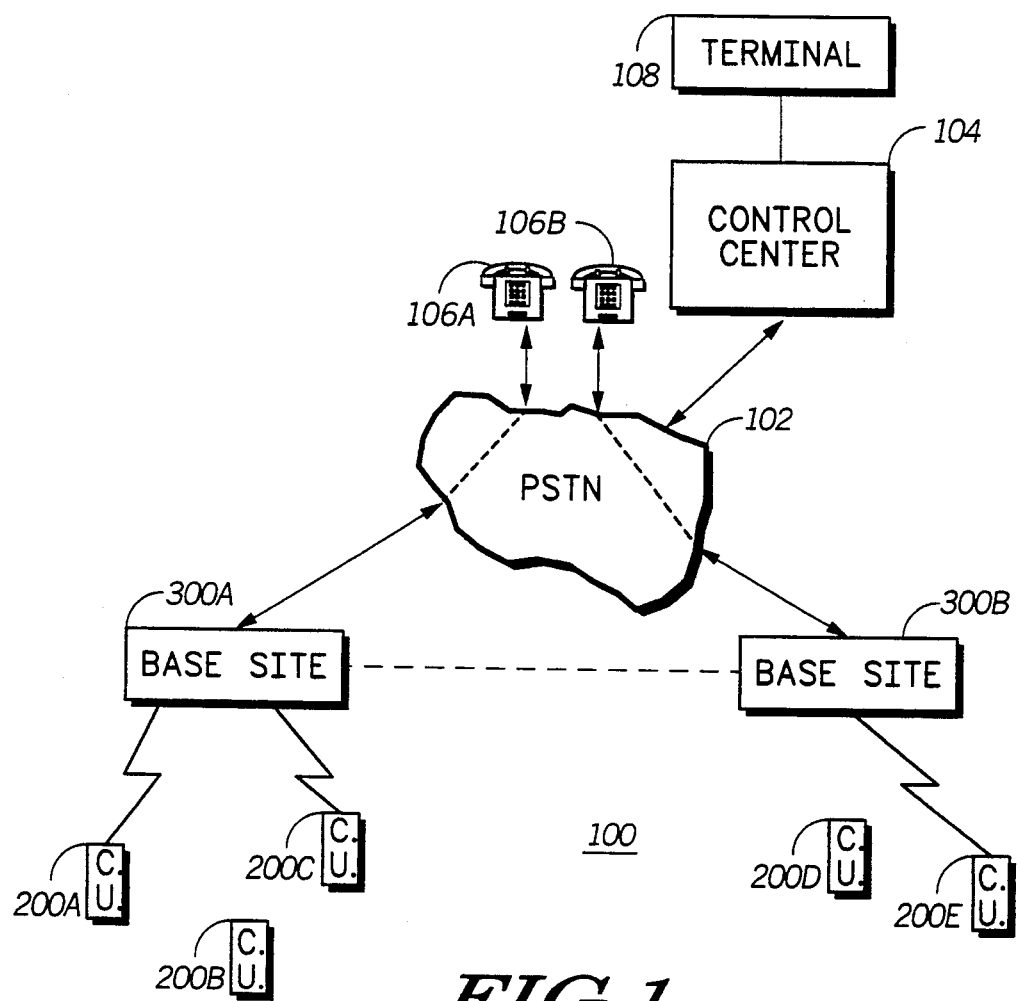
FIG. 1 is a block diagram of a communication system suitable for employing an embodiment of the present invention.

FIG. 1 illustrates a communication system 100 suitable for employing the present invention. In the preferred embodiment, the communication system 100 comprises a second generation cordless telephone system commonly referred to as "CT-2" by those skilled in the art. As will be appreciated from the following, the present invention can apply to a CT-2 communication system based upon the CT-2 Common Air Interface (CAI) Standard, or a derivative thereof, as well as find application in any number of different types of communication systems.

As can be seen in FIG. 1, a CT-2 communication system is centered about a conventional public or private switched telephone network (PSTN) 102. A communication service provider controls the system via one or more terminals 108 coupled to a control center 104, which in turn is coupled to a plurality of base sites 300a-b through the PSTN 102 on a periodic basis. The base sites 300a-b are distributed throughout the communication system to provide a wide area communication service. As is typical of a CT-2 communication system, the preferred base sites are capable of communicating on forty different communication channels, although in practice only twenty channels are used at any given time to minimize adjacent channel interference. The base sites also maintain a record of the usage of the communication system by each of the communication units, which is transmitted periodically to the control center 104 for billing purposes.

A plurality of communication units 200a-e are free to roam within the communication system coverage area and communicate with other individuals having access to conventional public or private wireline telephone sets 106 or the like. To gain access to the communication system, the communication units 200 are required to request access to the communication system by transmitting a request signal to the nearest base site (i.e., communication units 200a-c to base site 300a, and communication units 200d-e to base site 300b). If a channel is available at a base site receiving a request to access the communication system 100, the communication unit will be permitted to communicate provided that the communication unit is registered on the communication system.

Once communication has been established, the base sites of the preferred embodiment of the present invention continually examine or monitor the wireless channel to determine or verify the integrity of the wireless channel. In this way, the base sites operate to allow communication to the telephone network so long as the integrity of the wireless channel is maintained, and mute communication to the telephone network when the integrity of the wireless channel is compromised thus preventing loud noise bursts from being received by the other party to the conversation.

Figure 2:
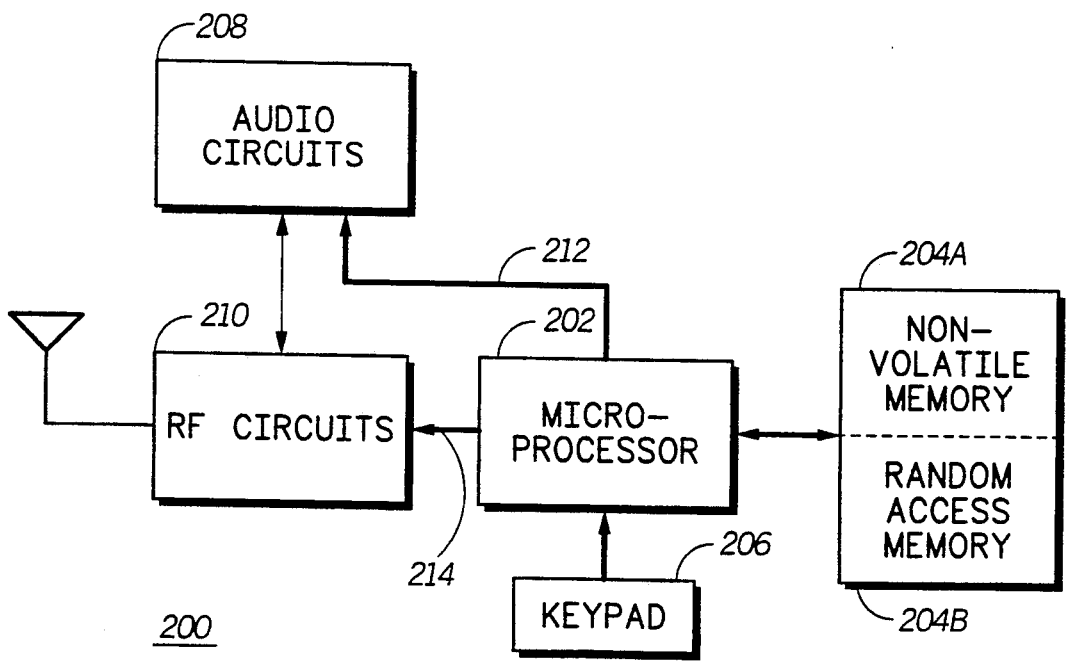
FIG. 2 is a block diagram of a communication unit of FIG. 1.

Referring to FIG. 2, a communication unit 200 preferably comprises a CT-2 compatible transceiver constructed and arranged to comply with the CT-2 time division duplex (TDD) CAI or any other protocol that may be used in any particular implementation of a communication system. The preferred communication unit 200 operates under control of a microprocessor (or microcontroller or equivalent) 202 coupled to non-volatile memory 204a and random access memory 204b. To communicate via the communication unit, the user first activates the communication unit via a switch on a keypad 206. Automatically, the communication unit contacts the nearest base site in accordance with the CT-2 CAI protocol to be hereinafter discussed. After receiving a dial tone, the user of the communication unit selects (dials) a number associated with the person to whom he or she desires to communicate via the keypad 206. Once a communication channel has been established through the PSTN, the user can speak to and hear the called party via the audio circuits 208 and the radio frequency (RF) circuits 210, which are controlled by the microprocessor 202 via control lines 212 and 214 respectively.

During a communication, the audio circuits 208 operate to digitize the voice of the wireless user for transmission over the wireless channel. Such voice digitization circuits are well known in the art, and may comprise conventional voice coding techniques such as sub-band coding or linear predictive coding. The digitized voice information is divided into time frames and transmitted via the RF circuits 210 with data information from the microprocessor 202 in a preferred time division multiplex arrangement that will be hereinafter described.

Figure 3:
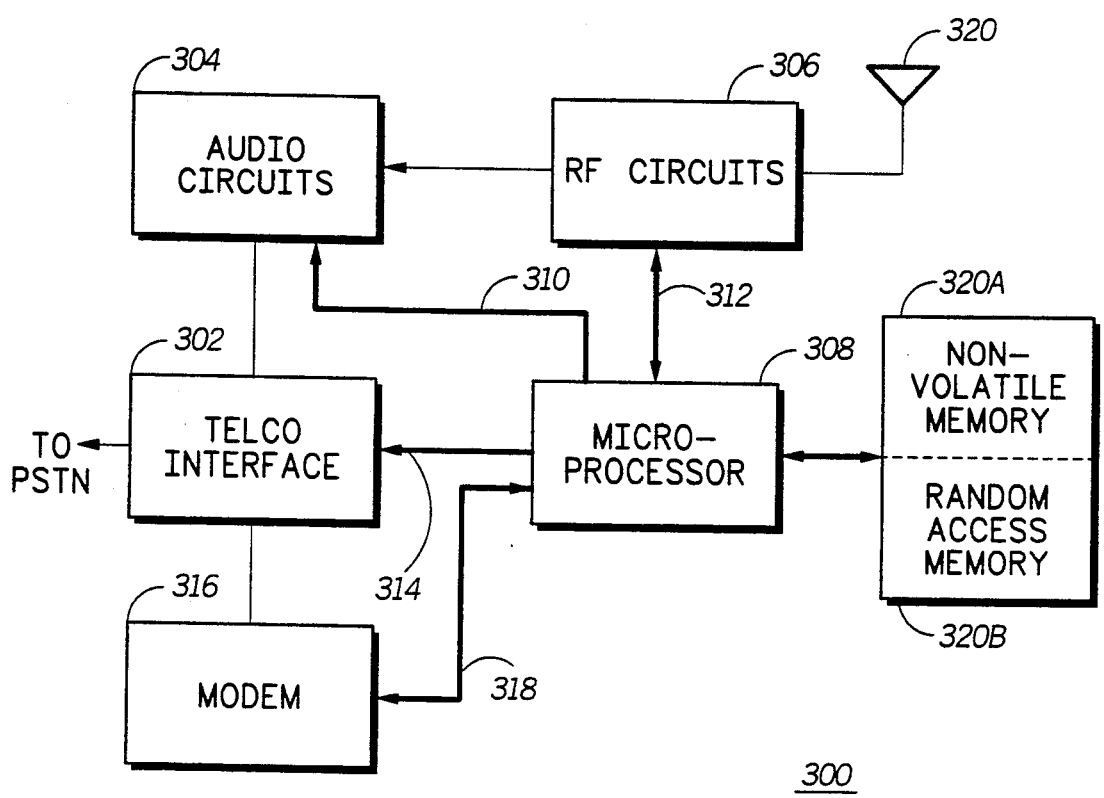
FIG. 3 is a block diagram of a base site of FIG. 1.

Referring to FIG. 3, a preferred embodiment of a base site 300 is illustrated in block diagram form. As discussed in conjunction with FIG. 1, the base site is coupled to the PSTN (via a telco type interface 302 in the preferred embodiment) to allow customers to communicate with other individuals and to allow the base site to communicate with the control center. When communicating with a communication unit, the PSTN is coupled through the telco interface 302 to audio circuits 304 and RF circuits 306, which are controlled by a microprocessor (or microcontroller or the like) 308 via control lines 310 and 312 respectively. The system usage of each customer is monitored by the microprocessor 308, and a data base is maintained in the non-volatile memory portion 320a of the memory 320. Additionally, the memory 320a contains any other system control parameters as may be implemented in any given communication system. Conversely, the telco interface 302 is controlled (via control line 314) to couple the PSTN to a modem (or equivalent) 316, which is coupled to the microprocessor 308 via data line(s) 318. In this way, the control center can receive and send updates to the disable list, billing information, and other system parameters during the periodic data base updates.

During a communication, information is received from the wireless channel via an antenna 320 and the RF circuits 306. In the preferred embodiment, the RF circuits direct received digitized voice information to the audio circuits 304 and data information to the microprocessor 308. The audio circuits 304 operate to convert the digitized voice information into its analog form so that the voice signals can be directed to the telephone network for reception by the other party to the conversation. According to the invention, however, the microprocessor 308 processes the received data information to verify or determine the status or integrity of the wireless channel. So long as the integrity of the wireless channel is maintained, the voice signals are forwarded to the telephone network. However, with the integrity of the wireless channel is compromised or in question, the present invention operates to rapidly mute the audio lines to prevent the other party from receiving a noise burst.

Figure 4:
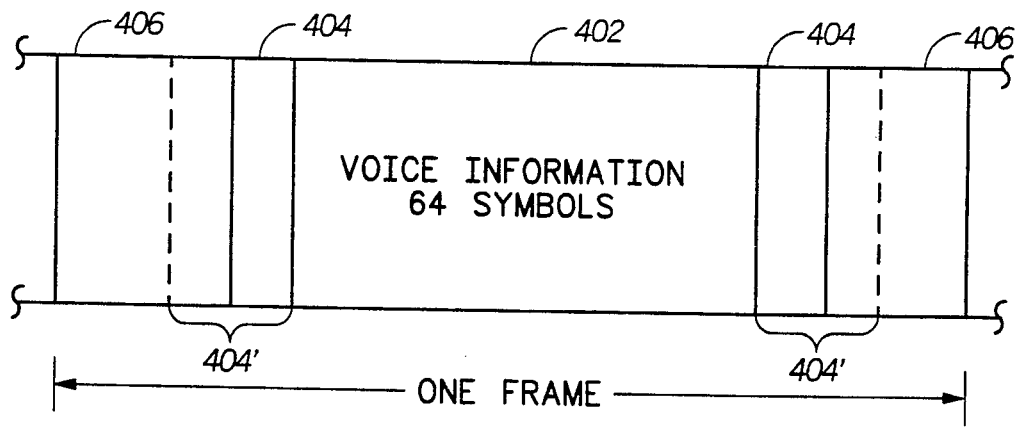
FIG. 4 is an illustration of the information communicated over the wireless communication channel in accordance with the present invention.

FIG. 4 illustrates the preferred time division information format. The preferred signal 400 comprises a frame having 72 symbols. The voice information 402 preferably resides in the central portion of the frame 400 and comprises 64 symbols of digitized voice. One symbol of data information 404 preferably resides on both sides of the voice information 402. Optionally, two symbols of data information 404' can be positioned on both sides of the voice information so long as the communication link is sufficiently strong to allow a corresponding decease in the length of the guard bands 406, which preferably comprises 3 symbols and 2 symbols in duration respectively. As will be readily apparent to those skilled in the art, the signal 400 is compliant with the CT-2 CAI, which is the preferred embodiment of the communication system 100.

Since data information is transmitted at a preferred rate of two or four symbols per frame, the data information is preferably assembled into data blocks before being processed by the microprocessor 308 of the base site 300. In the preferred embodiment of the present invention, the data blocks are ¼ of a code word in length, the preferred code words being in accordance with the the CT-2 CAI. Of course, other code words could be used depending upon the particular communication system employing the present invention.

Figure 5A:
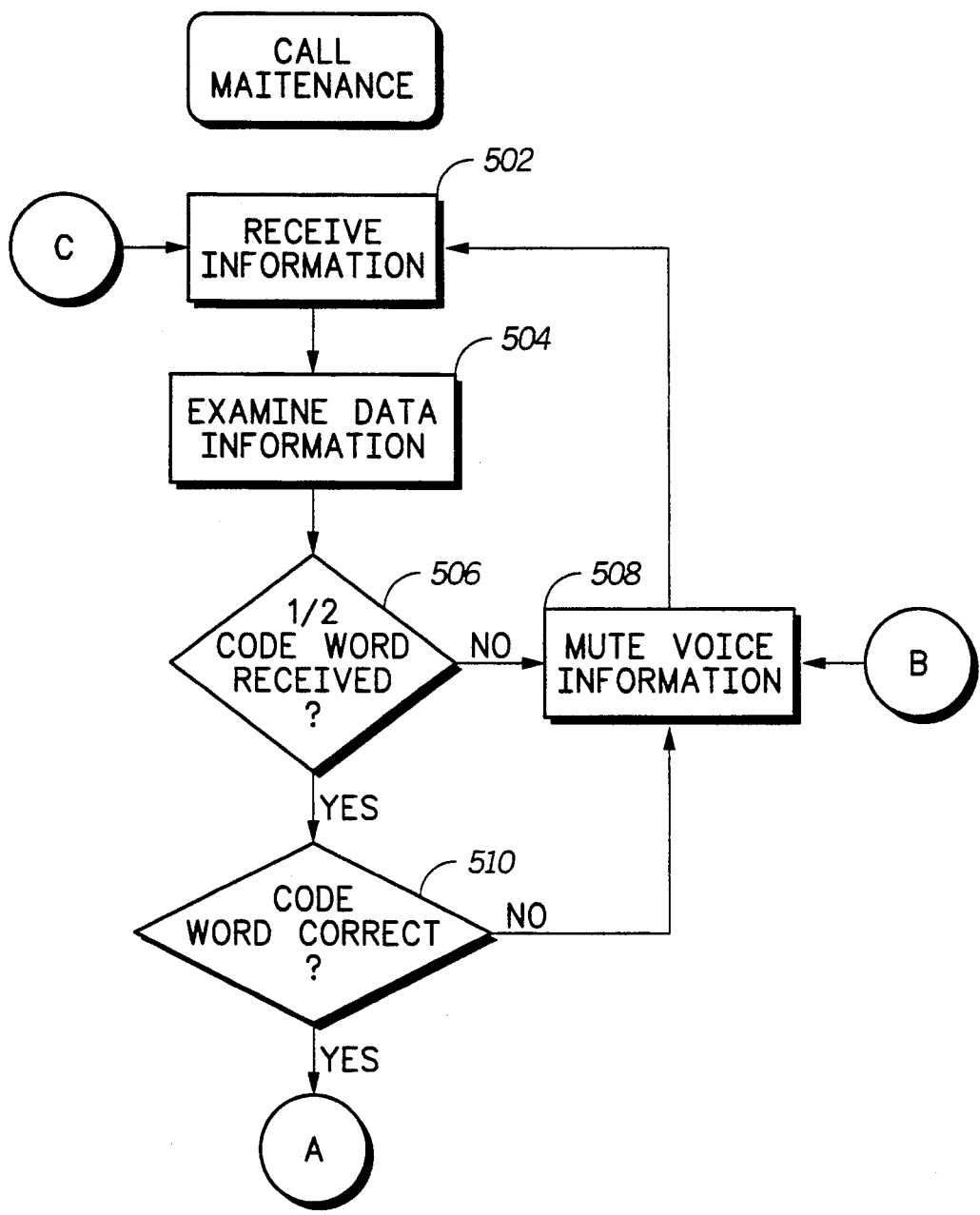
FIGS. 5a-5b are flow diagrams illustrating the operation of the base sites of FIG. 3 for call maintenance in accordance with the present invention.
Figure 5B:
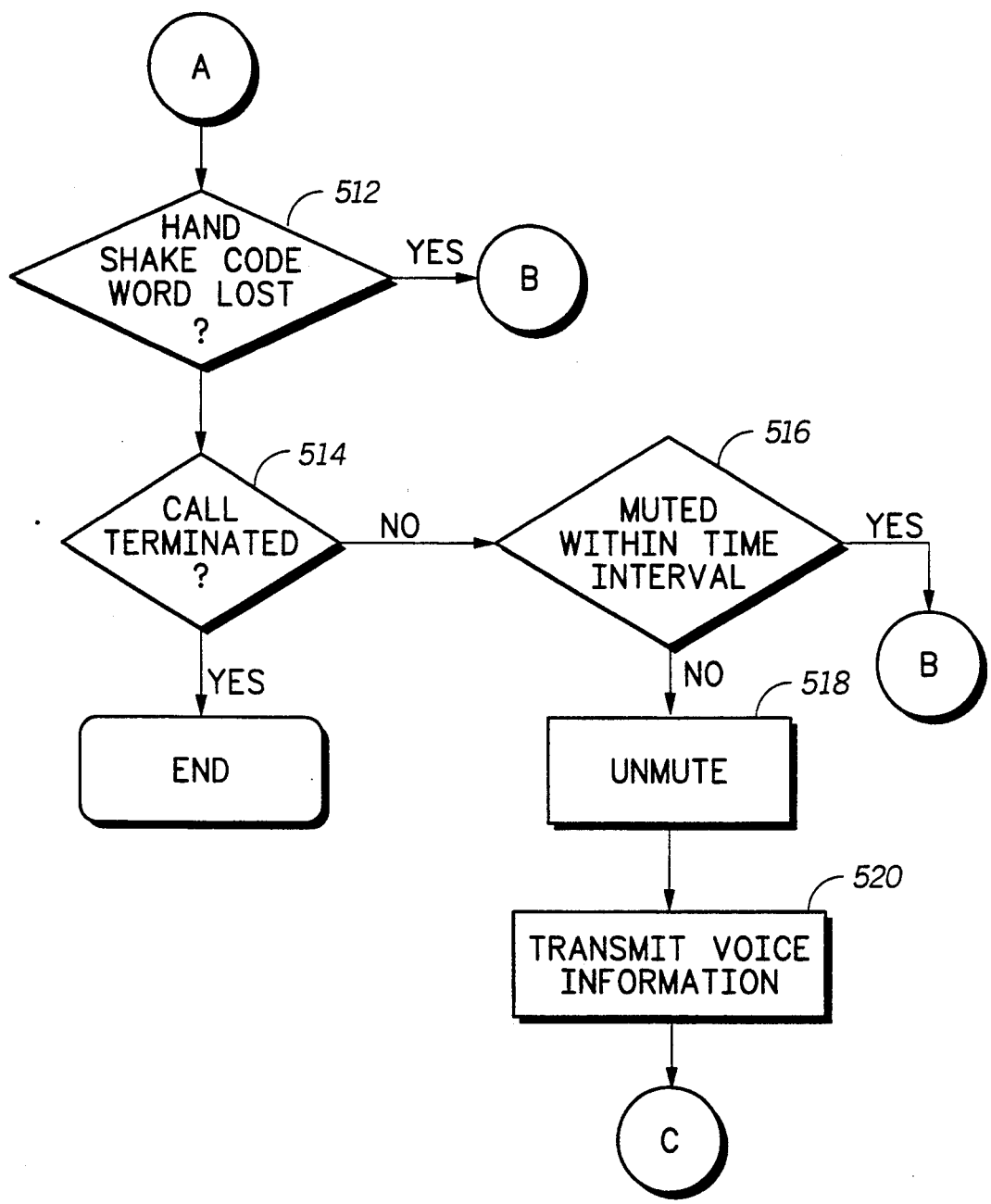

Referring to FIGS. 5a and 5b the operation of the base sites 300 in accordance with the present invention can be understood. In step 502 the base site receives the wireless transmission and extracts the data information from the voice information. As previously mentioned, the data information is preferably processed in step 504 to assemble data blocks or data words. To determine or verify the integrity of the wireless communication channel, the data information is preferably examined in blocks comprising ¼ code words that conform to the CT-2 CAI. According to the CAI code words must be transmitted every 100 ms when sending two data symbols per frame, and every 50 ms when sending four data symbols per frame. By examining ¼ code words, a rapid decision can be made to afford the present invention the ability to mute the voice information in 50 ms if the integrity of the wireless communication channel is compromised. Accordingly, decision 506 determines whether ¼ code was timely received. If not, the audio is immediately muted (step 508) using any of several known techniques for preventing the progress of electronic signals (e.g., switch, attenuator, transmission gate, etc.). Thus, failure to timely receive the data information is one technique employed by the present invention to verify the integrity of the wireless communication channel.

Assuming, however, that the base site is receiving ¼ code words at the appropriate rate, decision 510 determines, on average, if the received code words are correct or free from errors. That is, the received data preferably is timely received and is, on average, uncorrupted by noise or other electronic or electromagnetic interference. Failure of the code words to be correct on the average also results in the immediate muting of the audio path. This rapid muting prevents the other party from receiving a loud noise burst when the wireless link becomes temporarily or permanently compromised.

Assuming that the received code words are, on average, correct, decision 512 determines whether a particular code word has been lost for longer than a time interval. This hand shake code word is defined in the CT-2 CAI and is particularly sought by the present invention both to rapidly mute the audio and to trigger a call termination procedure to be hereinafter discussed. Failure to receive the hand shake code word also causes an immediate mute (step 508) of the audio circuitry to prevent a noise burst from being directed to the PSTN.

An affirmative determination of decision 512 completes the verification of integrity of the wireless communication channel by the present invention. Of course, one or more of the above checks could be omitted in any particular implementation. The preferred embodiment of the present invention, however, employs the multi-level approach to balance un-necessary muting and the risk of sending a noise burst to the other party to the conversation.

Decision 514 determines whether the call has been terminated. If so, the routine ends. Conversely, of the call continues, decision 516 determines whether the audio was muted within a time interval or period which preferably comprises 200 ms. That is, if the audio path was muted within the last 200 ms, the audio remains muted (step 508) until the time interval has expired and all of the preferred integrity checks have assured the integrity of the wireless channel. This practice also alleviates rapid muting and un-muting, which may be an annoyance to users of the communication system.

Assuming that the voice information was not muted within the past 200 ms (a negative determination of decision 516) the audio path is un-muted (step 518) and the voice information is directed to the PSTN for delivery to the other party to the conversation (step 520). In this way, the voice information may be repeatedly muted and un-muted during a conversation to maximize information throughput while guarding against sending noise bursts to one party to the conversation.

Figure 6:
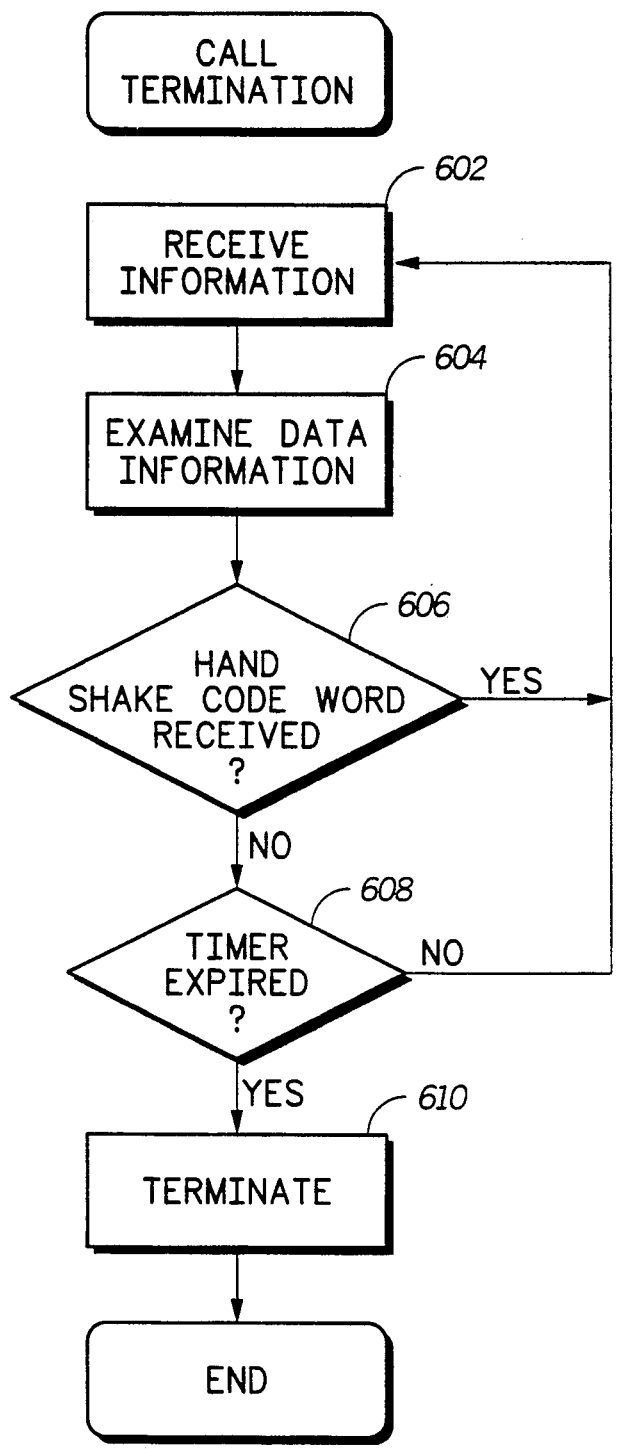
FIG. 6 is a flow diagram illustrating the operation of the base sites of FIG. 3 to terminate a communication in accordance with the present invention.

Referring to FIG. 6, the preferred call termination routing begins in step 602, in which the base site receives the wireless transmission and extracts the data information from the voice information. As previously mentioned, the data information is preferably processed (in step 604) to assemble data code words that conform to the CT-2 CAI. Decision 608 determines whether the hand shake code word as defined in the CT-2 CAI has been lost to determine whether to trigger a call termination. Failure to resume the wireless link within the following ten seconds (decision 608) causes an immediate call termination (step 610). However, if the wireless channel is re-acquired during this time, the call can continue subject to the call maintenance routine discussed in conjunction with FIGS. 5a and 5b.

We claim:

1. In a communication system supporting communication between wireless communication units and wireline telephone units via base sites coupled to a telephone network, a method for maintaining an established communication, comprising the base site steps of:
   receiving a signal representing voice information and data information transmitted from the wireless communication unit via a communication channel;
   processing at least the data information to verify the integrity of the communication channel; and
   re-transmitting the voice information to the wireline telephone unit via the telephone network when the integrity of the communication channel is verified to maintain communication between the wireless communication unit and the wireline telephone unit, and preventing the re-transmission of the information to the wireline telephone unit when the integrity of the communication channel cannot be verified to prevent the wireline telephone unit from receiving noise or interference.

2. The method of claim 1, wherein the step of processing comprises the step of assembling the data information into data blocks.

3. The method of claim 1, wherein the step of processing comprises the step of assembling the data information into data blocks being approximately one-half code word in length.

4. The method of claim 1, wherein the step of processing comprises the steps of:
   assembling the data information into data code words;
   determining whether the code words are substantially error free.

5. The method of claim 1, wherein the step of processing comprises the steps of:
   assembling the data information into data code words;
   determining whether a particular code word was received within a time interval.

6. A method for maintaining a communication, comprising the base site steps of:
   receiving a signal representing a plurality of time division frames of voice information and data information from a wireless communication channel;
   assembling the data information into data blocks;
   processing at least the data blocks to verify the integrity of the communication channel; and
   directing the voice information to a telephone network when the integrity of the wireless communication channel is verified.

7. The method of claim 6, which includes the step of preventing the voice information from being directed to the telephone network when the integrity of the communication channel cannot be verified.

8. The method of claim 6, wherein the step of processing comprises the step of assembly the data information into data blocks being approximately one-half code word in length.

9. The method of claim 6, wherein the step of processing comprises the steps of:
   assembling the data information into data code words;
   determining whether the code words are substantially error free.

10. The method of claim 6, wherein the step of processing comprises the steps of:
    assembling the data information into data code words;
    determining whether a particular code word was received within a time interval.

11. A method for maintaining a communication, comprising the base site steps of:
    receiving a signal representing a plurality of time division frames of digitized voice information and data information from a wireless communication channel;
    assembling the data information into data blocks;
    determining whether the data blocks were received at a predetermined rate and are substantially free of errors to verify the integrity of the communication channel;
    converting the digitized voice information into voice signals;
    directing the voice signals to a telephone network when the integrity of the wireless communication channel is verified; and
    preventing the voice signals from being directed to the telephone network when the integrity of the wireless communication channel cannot be verified.

12. A communication system supporting communication between wireless communication units and wireline telephone units via base sites coupled to a telephone network, the base site comprising:
- means for receiving a signal representing voice information and data information transmitted from the wireless communication unit via a communication channel;
- means for processing at least the data information to verify the integrity of the communication channel; and
- means for re-transmitting the voice information to the wireline telephone unit via the telephone network when the integrity of the communication channel is verified to maintain communication between the wireless communication unit and the wireline telephone unit, and including means for preventing the re-transmission of the information to the wireline telephone unit when the integrity of the communication channel cannot be verified to prevent the wireline telephone unit from receiving noise or interference.

13. The communication device of claim 12, which includes means for assembling the data information into data blocks.

14. The communication device of claim 13, wherein the processing means includes means for determining whether the data blocks are substantially error free.

15. A communication device, comprising:
- means for receiving a signal representing a plurality of time division frames of voice information and data information from a wireless communication channel;
- means for assembling the data information into data blocks;
- means for processing at least the data blocks to verify the integrity of the communication channel; and
- means for directing the voice information to a telephone network when the integrity of the wireless communication channel is verified.

16. A communication device, comprising:
- means or receiving a signal representing a plurality of time division frames of digitized voice information and data information from a wireless communication channel;
- means for assembling the data information into data blocks;
- means for determining whether the data blocks were received at a predetermined rate and are substantially free of errors to verify the integrity of the communication channel;
- means for converting the digitized voice information into voice signals;
- means for directing the voice signals to a telephone network when the integrity of the wireless communication channel is verified; and
- means for preventing the voice signals from being directed to the telephone network when the integrity of the wireless communication channel cannot be verified.

* * * * *